(No Model.)

S. M. MOORE.
VEHICLE SPRING.

No. 583,071. Patented May 25, 1897.

Inventor
Seth M. Moore,

Witnesses
By his Attorneys,

UNITED STATES PATENT OFFICE.

SETH M. MOORE, OF NORMAN, OKLAHOMA TERRITORY, ASSIGNOR OF ONE-HALF TO DELBERT L. LARSH, OF SAME PLACE.

VEHICLE-SPRING.

SPECIFICATION forming part of Letters Patent No. 583,071, dated May 25, 1897.

Application filed October 14, 1896. Serial No. 608,863. (No model.)

*To all whom it may concern:*

Be it known that I, SETH M. MOORE, a citizen of the United States, residing at Norman, in the county of Cleveland and Territory of Oklahoma, have invented a new and useful Vehicle-Spring, of which the following is a specification.

The invention relates to improvements in vehicle-springs.

The object of the present invention is to improve the construction of supporting-springs for buggies, road-carts, and similar vehicles, and to provide a simple and inexpensive construction which will be capable of maintaining the body of a vehicle in a horizontal position independent of the disposition of the load and which will cause both sides of the body to rise and fall at the same instant in passing over obstructions or dropping into ruts, and thereby relieve the vehicle of all rocking or lateral jerking motion and the strain incident to the same and to sudden shifting of a load.

The invention consists in the construction and novel combination and arrangement of parts hereinafter fully described, illustrated in the accompanying drawings, and pointed out in the claims hereto appended.

Figure 1:
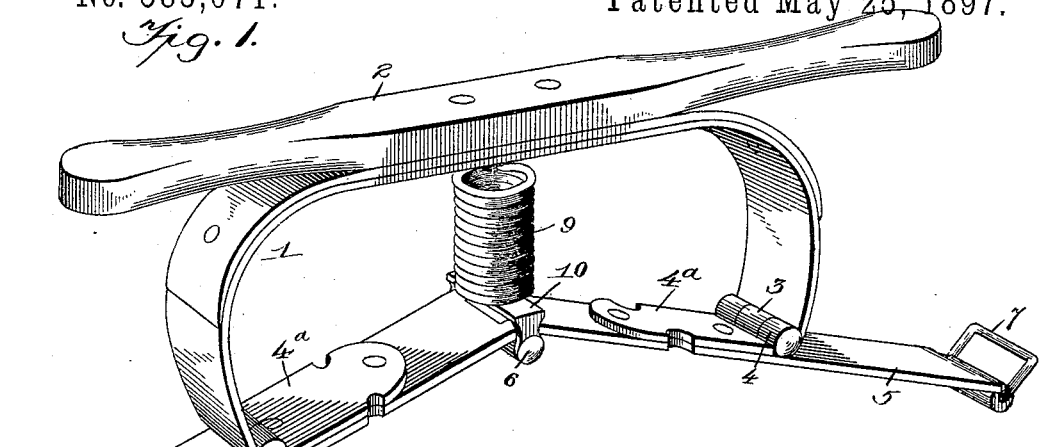
Figure 3:
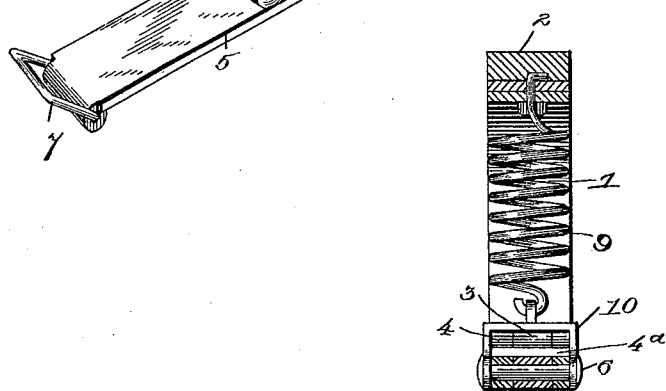
Figure 2:
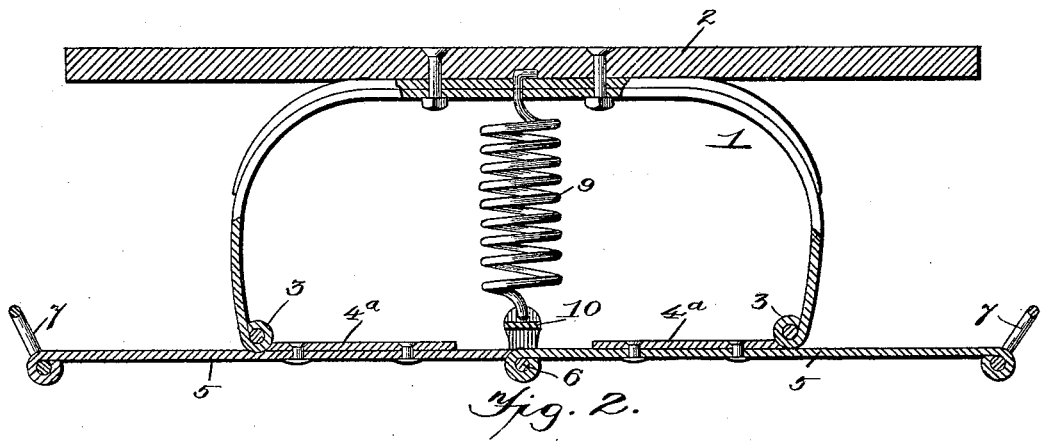

In the drawings, Figure 1 is a perspective view of a vehicle-spring constructed in accordance with this invention. Fig. 2 is a longitudinal sectional view of the same, the transverse bars being depressed to a horizontal position and showing the arrangement of parts when a vehicle is loaded. Fig. 3 is a transverse sectional view, the parts being arranged as illustrated in Fig. 2.

Like numerals of reference designate corresponding parts in all the figures of the drawings.

1 designates a substantially semielliptic leaf-spring having a horizontal top portion and depending sides which curve inward slightly, as clearly illustrated in Figs. 1 and 2 of the drawings, and the top portion of the leaf-spring, which is designed to be disposed transversely of a vehicle-body and running-gear, is centrally secured to a transverse bar 2, which may be a portion of the body of a vehicle or the running-gear or may be secured to the same in any suitable manner. The ends or arms of the leaf-spring, which is disposed substantially vertically, are provided with eyes 3 and are hinged to corresponding eyes 4 of a pair of bars 5, which are hinged together at their inner ends by a pintle 6, passing through corresponding eyes of the bars 5. The outer ends of the hinged bars 5 are provided with stirrups or loops 7 and are designed to be suspended within a running-gear from opposite sides thereof, as will be readily understood.

The eyes 4, to which the ends of the springs 1 are hinged, are located intermediate of the ends of the hinged bars 5 and are preferably formed integral with plates $4^a$, which are secured to the upper faces of the bars 5, but the eyes thereof may be constructed in any other suitable manner. The inner ends of the hinged bars are connected with the top of the spring 1 by a centrally-arranged coiled spring 9, which has its upper end passed through a perforation of the spring 1 or otherwise secured to the same. The lower end of the spring is secured to a shackle or loop 10, which straddles the inner hinged ends of the bars 5 and which is secured to the same by the pivot or pintle 6. The shackle or loop 10 is provided at its top with a centrally-arranged perforated ear, through which is passed the lower terminals of the coiled spring 9. The transverse hinged bars 5 are oppositely inclined and normally extend downward and outward from the lower end of the coiled spring, and when their inner ends are depressed they straighten out or lengthen and carry the arms of the leaf-spring with them.

The vehicle-body (not shown) may be mounted on the leaf-spring in any suitable manner, as will be readily understood, and when it is loaded the central coiled spring 9 is distended, as illustrated in Figs. 2 and 3 of the drawings, and simultaneously with this operation of the central spring the sides of the vertical leaf-spring are moved outward and assist in supporting the load, so that the strain is equally distributed between the two springs. The coiled spring is first affected by the load and is adapted to form an efficient and elastic cushion when the body of the vehicle is subjected to a light load only, and both springs come into play when the vehicle is heavily loaded, and by this construction and arrangement of springs the body is thoroughly cushioned for either a heavy or light load. The arrangement of the springs is such that the body of a vehicle is always maintained in a horizontal position and will conform to the frame and the running-gear, irrespective of the disposition of the load, so that a child and a very heavy man may occupy a seat without tilting the vehicle in the slightest. The weight is equally distributed to the springs and is transmitted to them at the hinge-joints at the ends of the curved arms or sides of the spring 1, the latter bearing at least one-half the weight, and the coiled spring, which is fastened to the inner ends of the hinged bars, can only bear the other half, and these hinge-joints provide three distinct bearings, which act in unison and relieve the strain from any one point. The springs are self-adjusting and when the wheels of a vehicle pass over obstructions or drop suddenly in short ruts the springs give evenly on both sides and act similarly, always relieving the body of the vehicle of rocking side motion, which is annoying to the occupants as well as destructive of the vehicle. The running-gear is protected and rendered more durable by keeping the weight uniform over a rough road, both sides of the body rising and falling at the same instant. Thereby the parts are relieved of the strain incident to the rocking or reeling of the body or top and of shifting the weight suddenly to the lower and weaker side. The spiral or coiled spring is designed to be of sufficient strength to carry an ordinary load with ease, and should the load be too great for the spiral or coiled spring the latter is pressed downward and the hinged bars are lengthened, thereby forcing the sides or arms of the leaf-spring outward. The leaf-spring is designed to possess great strength and comes into play but slightly, except when a vehicle is heavily loaded. The springs adjust this to the load to be carried and the resiliency is always in proportion to the weight.

The vehicle-spring may be readily applied to a variety of vehicles, the stirrups may be attached to the side-bars of the running-gear, or the vehicle-spring may be inverted, so that the stirrups may be connected with the body.

Changes in the form, proportion, and minor details of construction may be resorted to without departing from the principle or sacrificing any of the advantages of the invention.

What I claim is—

1. In a device of the class described, the combination of a transverse spring centrally secured to a suitable support, and consisting of a central horizontal portion and substantially vertically-disposed arms, the oppositely-inclined bars normally converging toward their inner ends and hinged together at that point, and a vertically-disposed coiled spring interposed between the central portion of the transverse spring and the inner ends of said bars and connected with those parts, substantially as described.

2. In a device of the class described, the combination of a substantially semielliptic leaf-spring centrally secured to a suitable support and consisting of a horizontal portion and substantially vertically-disposed curved arms adapted to be spread or forced outward, the oppositely-inclined bars hinged at points intermediate of their ends to the arms of the spring, and a coiled spring connecting the inner ends of the arms with the central portion of the said spring, substantially as described.

3. In a device of the class described, the combination of a substantially semielliptic leaf-spring having a horizontal portion and provided with curved sides, oppositely-inclined bars hinged at their inner ends and similarly connected at points intermediate of their ends to the terminals of the leaf-spring, stirrups arranged at the outer ends of the inclined bars, a shackle embracing the inner ends of the bars and connected with the pintle or pivot thereof, and a coiled spring secured to the shackle and connected with the horizontal portion of the leaf-spring and interposed between the latter and the inclined bars, substantially as described.

In testimony that I claim the foregoing as my own I have hereto affixed my signature in the presence of two witnesses.

SETH M. MOORE.

Witnesses:
RUFUS LE FOES,
CHAS. L. BOTSFORD.